United States Patent
Mosig

[11] Patent Number: 5,669,555
[45] Date of Patent: Sep. 23, 1997

[54] MOTOR VEHICLE HEATING DEVICE WITH EXHAUST CONNECTION PIECE AND BAFFLE PLATE

[75] Inventor: Ernst Mosig, Penzberg, Germany

[73] Assignee: Webasto Thermosysteme GmbH, Stockdorf, Germany

[21] Appl. No.: 642,843

[22] Filed: May 6, 1996

[30] Foreign Application Priority Data

May 6, 1995 [DE] Germany ............... 195 16 688.4

[51] Int. Cl.[6] ............................................. B60H 1/02
[52] U.S. Cl. ....................... 237/12.3 C; 126/85 B; 126/312; 454/302
[58] Field of Search ............... 454/302, 35; 126/85 B, 126/312; 237/12.3 C; 431/19, 20

[56] References Cited

U.S. PATENT DOCUMENTS 1,811,654  6/1931  Sheperd ........................ 431/20
5,046,663  9/1991  Bittmann.

Primary Examiner—Henry A. Bennett
Assistant Examiner—Devek S. Boles
Attorney, Agent, or Firm—Sixbey, Friedman, Leedom & Ferguson, P.C.; David S. Safran

[57] ABSTRACT

A motor vehicle heating device with an exhaust connection piece (3) and a baffle plate (9) located near its exit opening. The baffle plate (9) is attached to the exhaust connection piece (3) by means of a spring element (7), preferably by means of hook-shaped end (10) of the spring which fits into recess (6) of a flow-dividing bulkhead (5) of the exhaust connection piece (3). Another part of spring element (7) is made as a compression spring which has compressible outer part (11) which rests against a shoulder (12) of the exhaust connection piece (3). The invention enables simple, cost-favorable attachment of a baffle plate on an exhaust connection piece by means of which outstanding noise damping is achieved.

14 Claims, 1 Drawing Sheet

MOTOR VEHICLE HEATING DEVICE WITH EXHAUST CONNECTION PIECE AND BAFFLE PLATE

BACKGROUND OF THE INVENTION

1. Field of the Invention

The invention relates to a motor vehicle heating device with an exhaust connection piece and baffle plate located near its exit opening.

2. Description of Related Art

Baffle plates mounted a short distance in front of the exit openings of the exhaust connection piece are used to deflect the exhaust flows and to prevent the penetration of dirt and foreign bodies into the motor vehicle heating device. In a solution which has been used for a long time in the applicant's company, a baffle plate with the shape of a spherical cap is attached by means of several holders which are spot welded to the periphery of the exhaust outlet connection piece. This solution is relatively costly.

SUMMARY OF THE INVENTION

The primary object of this invention is to make the installation of a baffle plate on an exhaust connection piece of a motor vehicle heating device simpler and less costly.

This object is achieved by the baffle plate being attached to the exhaust connection piece by means of a spring element. Because the baffle plate is attached to the exhaust connection piece by means of a spring element, on the one hand, a simple, cost-favorable installation is possible, and on the other, an attachment form especially suited to damping of vibration is devised. The baffle plate can be easily removed again when necessary.

According to an advantageous embodiment, the spring element is made as a compression spring which fits into a recess of one wall of the exhaust connection piece with a hook-shaped end. Use of a compression spring enables especially simple installation by pressing the baffle plate against the exhaust connection piece, the spacing of the two parts being automatically produced by subsequent release of the compression spring. An inner bulkhead which is used to divide the exhaust flow into several component flows is used especially advantageously as a wall to accommodate the hook-shaped end of the spring. When attached to one such inner bulkhead, a tension force exerted by the hook on the bulkhead acts as a counterforce to the force of the compression spring.

Furthermore, it is especially advantageous if a compressible outer part of the compression spring is supported on a projection of the exhaust connection piece. This outer part, itself, is preferably formed by a resilient turn of a helical spring. The projection, in turn, is advantageously formed as a shoulder on the inner periphery of the exhaust connection piece. By means of this attachment, the exhaust connection piece appears smooth from the outside. The compression spring is held securely against the exhaust connection piece by a wall which surrounds the projection.

These and further objects, features and advantages of the present invention will become apparent from the following description when taken in connection with the accompanying drawings which, for purposes of illustration only, shows a single embodiment in accordance with the present invention.

DETAILED DESCRIPTION OF THE PREFERRED EMBODIMENT

Figure 1:
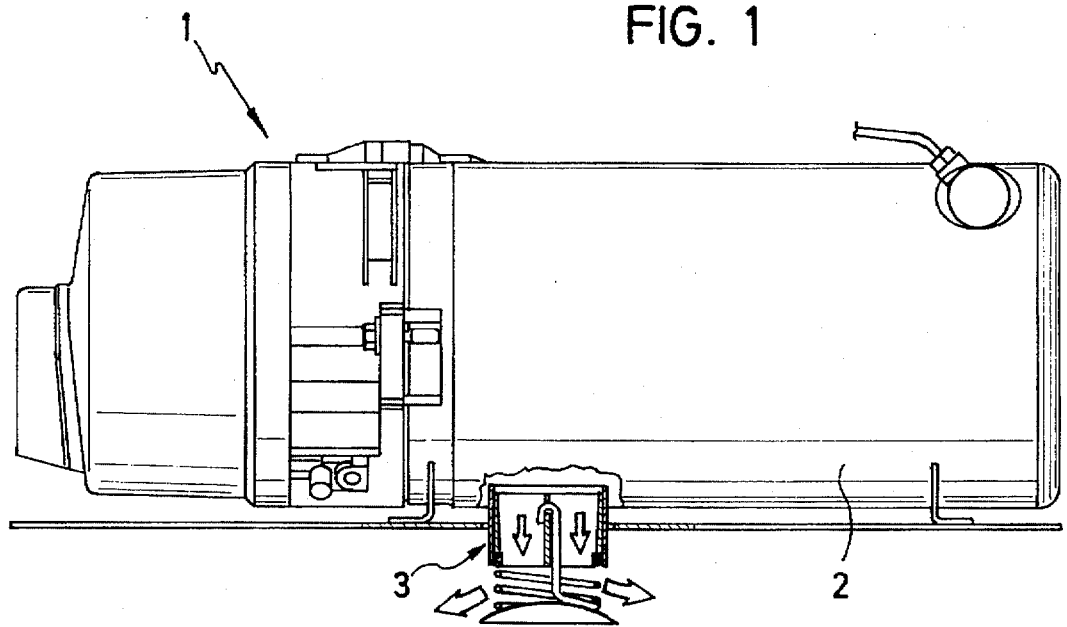
FIG. 1 is schematic illustration of a motor vehicle heating device incorporating the present invention.

In motor vehicle heating device 1, in the known manner, a combustible mixture is produced from a supply of combustion air and fuel, and after burning of the mixture in a combustion chamber, combustion passes through a heat exchanger of the heating device in the form of an exhaust flow. This exhaust flow heats a gaseous or liquid heat transfer medium for heating an internal combustion engine and/or the interior of a vehicle. After leaving the heat exchanger, the exhaust flow is routed into the open via an exhaust connection piece 3 which is mounted on the housing 2.

To prevent penetration of foreign bodies and dirt, and to prevent pressure fluctuations due to head wind, a baffle plate 9 is mounted in front of the exit opening of exhaust connection piece 3, at a short distance from it. Baffle plate 9 has the shape of a spherical cap. The convex side of baffle plate 9 faces the exhaust connection piece 3 for distribution of the exhaust discharging from it. The exhaust connection piece 3 has an outer wall 4, and an internal bulkhead 5 by means of which the exhaust flow is divided into at least two partial flows. This division of the exhaust flow, as known from U.S. Pat. No. 5,046,663, yields a noise damping effect.

Bulkhead 5 has a recess 6 at a short distance to the exit opening. Baffle plate 9 is attached to the exhaust connection piece 3 using a spring element 7. To do this, the spring element 7 is made in the form of a helical spring having an attachment winding 8 which is joined, for example, to baffle plate 9 by welding. From attachment winding 8, a part of the spring element 7 is angled radially inward and then extends axially through and projects beyond the helically coiled windings of spring element 7. This projecting part is provided with a hook-shaped end 10 which fits over the bulkhead 5 within the recess 6.

Figure 2:
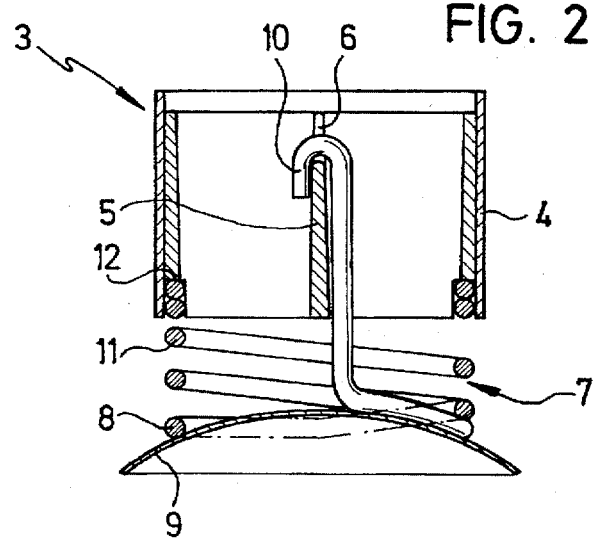
FIG. 2 shows an enlarged sectional view through an exhaust connection piece with a baffle plate.

The helically coiled part 11 of spring element 7 proceeds from attachment winding 8 in the form of a compression spring in the same direction as the inner part provided with hook-shaped end 10. The helically coiled part 11 acts as a compression spring and its uppermost winding rests against a radial projection in the form of a shoulder 12 which is located on the inner periphery of exhaust connection piece 3. The shoulder 12 can be produced by a double-walled pipe which has an inner pipe which is shorter in the direction to the discharge opening than the outer pipe 4 which is pushed over it. Alternatively, shoulder 12 can be produced by a turned groove in the end of a single wall pipe having a thickness corresponding to the combined thickness of the inner and outer pipes shown in FIG. 2.

The baffle plate is easily mounted by placing coiled part 11 of spring element 7 on the projection 12, and at the same time, compressing spring element 7 in the direction toward exhaust connection piece 3. Compression of coiled part 11 forces the hook-shaped end 10 to move up the bulkhead 5 in a slightly bent back condition, so that the hook-shaped end is caused to pass over the bulkhead 5 and then engage within recess 6 when the compression forces applied to the coiled part 11 are then released. Dismounting is easily possible by opposite motion.

Baffle plate 9 is resiliently prestressed with reference to exhaust connection piece 3 due to the attachment by means of the spring element 7. In this way, it will be possible to effectively prevent baffle plate 9 from vibrating, which can be caused by the pulsating exhaust flow. By means of the type of attachment of baffle plate 9 according to the invention to the divided flow, exhaust connection piece 3, outstanding noise damping can be achieved overall. Motor vehicle heating device 1 is, thus, simple and inexpensive in structure.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Motor vehicle heating device having a burner for combusting a mixture of fuel and air, and with an exhaust connection piece for discharging an exhaust gas flow from the burner out of the heating device, and a baffle plate located near an exhaust gas exit opening of the exhaust connection piece; wherein the baffle plate is arranged at a distance outwardly from the exhaust gas exit opening of the exhaust connection piece by means of a spring element.

2. Motor vehicle heating device according to claim 1, wherein the spring element is a compression spring which has a hook-shaped end which fits into a recess in a wall of the exhaust connection piece.

3. Motor vehicle heating device according to claim 2, wherein the wall of the exhaust connection piece comprises an inner bulkhead for dividing the exhaust gas flow.

4. Motor vehicle heating device according to claim 3, wherein the compression spring has a compressible outer part which surrounds the hook-shaped end and which is supported on a projection of the exhaust connection piece.

5. Motor vehicle heating device according to claim 4, wherein said outer part of the spring is a resilient winding of a helical spring.

6. Motor vehicle heating device according to claim 4, wherein the projection is a shoulder on an inner periphery of the exhaust connection piece.

7. Motor vehicle heating device according to claim 6, wherein the shoulder is formed by a pipe-shaped insert mounted within the exhaust connection piece, said pipe-shaped insert having a shorter length than the exhaust connection piece.

8. Motor vehicle heating device according to claim 6, wherein the flow dividing inner bulkhead is formed as part of said pipe-shaped insert.

9. Motor vehicle heating device according to claim 5, wherein the baffle is in the form of a spherically-contoured cap; and wherein an end winding of the helical spring is joined to a convex side of said cap.

10. Motor vehicle heating device according to claim 2, wherein the compression spring has a compressible outer part which surrounds the hook-shaped end and which is supported on a projection of the exhaust connection piece.

11. Motor vehicle heating device according to claim 10, wherein said outer part of the spring is a resilient winding of a helical spring.

12. Motor vehicle heating device according to claim 10, wherein the projection is a shoulder on an inner periphery of the exhaust connection piece.

13. Motor vehicle heating device according to claim 12, wherein the shoulder is formed by a pipe-shaped insert mounted within the exhaust connection piece, said pipe-shaped insert having a shorter length than the exhaust connection piece.

14. Motor vehicle heating device according to claim 11, wherein the baffle is in the form of a spherically-contoured cap; and wherein an end winding of the helical spring is joined to a convex side of said cap.

* * * * *